Figure 1:
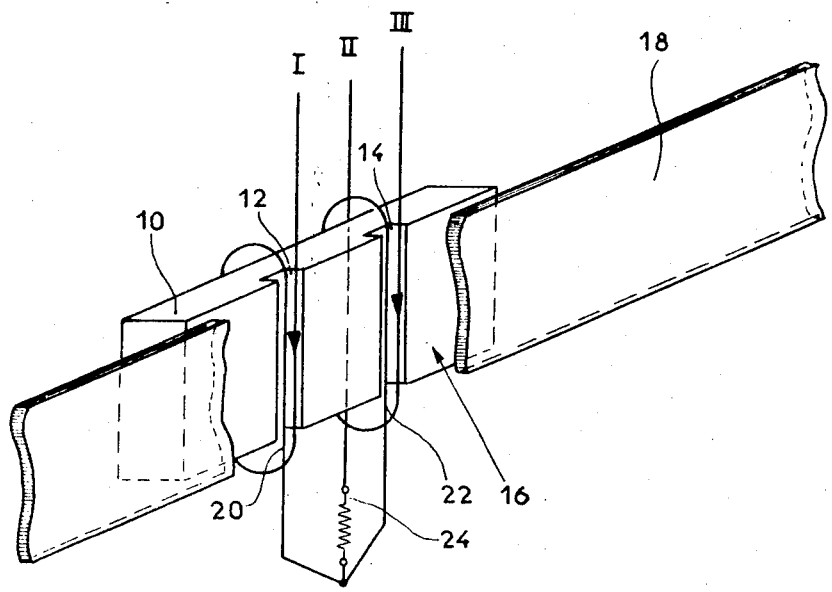

United States Patent
Pelenc

[15] 3,679,952
[45] July 25, 1972

[54] TWO SLOT LINEAR INDUCTION MOTOR

[72] Inventor: Yves Pelenc, La Tronche, France
[73] Assignee: Merlin Gerin Societe Anonyme, Grenoble, France
[22] Filed: Jan. 19, 1971
[21] Appl. No.: 107,749

[30] Foreign Application Priority Data
Feb. 25, 1970 France..................................7006858

[52] U.S. Cl...............................318/135, 318/220, 310/13
[51] Int. Cl........................................................H02k 41/02
[58] Field of Search..............310/12, 14; 318/220, 228, 230, 318/514, 216, 135, 121; 321/57, 58

[56] References Cited

UNITED STATES PATENTS

| | | | |
|---|---|---|---|
| 3,497,730 | 2/1970 | Doolittle | 310/13 |
| 2,731,212 | 1/1956 | Baker | 310/12 UX |
| 2,638,347 | 5/1953 | Maggi | 310/12 X |
| 1,547,844 | 7/1925 | Tanner | 321/58 X |

*Primary Examiner*—D. F. Duggan
*Attorney*—Stevens, Davis, Miller & Mosher

[57] ABSTRACT

Linear induction motor comprising a magnetic field structure bearing two spaced coils supplied with currents out of phase by an angle of $2\pi/3$ and dividing the air gap face into three equal pole faces to produce a balanced travelling magnetic field.

4 Claims, 2 Drawing Figures

PATENTED JUL 25 1972  3,679,952

TWO SLOT LINEAR INDUCTION MOTOR

This invention relates to a multiphase linear induction motor comprising a magnetic field structure and an armature movable relative to one another, the field structure being divisible into standard units or modules the length of which equals the pole pitch of the motor and each of which bears a winding to produce a travelling magnetic field in the air-gap separating the pole face of the field structure from the armature when supplied with a polyphase current.

Standardized production methods make it desirable to produce simplified modules or standard elements, of as small dimensions as possible, which can be combined or juxtaposed to give a very wide power range. One object of the present invention is to make a modular magnetic field structure of this type which can be combined with an armature element to form a linear motor.

Another object of the invention is to create a linear induction motor which can be supplied from a single-phase source and whose inductive flux is fully balanced.

The linear motor module according to the invention comprises two coils having active conductors or groups of active conductors spaced in the direction of travel of the travelling field, the currents flowing through the two conductors being electrically out of phase by an angle of substantially $2\pi/3$ so as to produce a balanced travelling magnetic field formed by a wave moving along the air-gap.

The supply source for the module may be a single-phase source, the $2\pi/3$ phase shift in one of the phases being obtained in any suitable way, which is a particular advantage when the motor is used in electric household appliances.

It is possible, of course, to use two of the phases of a three-phase supply.

Figure 2:
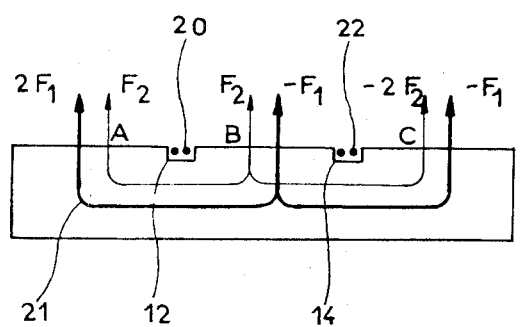

An embodiment of the invention will now be described in more detail, by way of example only, with reference to the accompanying drawings. In the drawings:

FIG. 1 is a diagrammatic perspective view of a linear motor embodying the invention, with part of the armature cut away; and FIG. 2 illustrates the distribution of the lines of force in the magnetic field structure shown in FIG. 1, the field structure being shown in plan view.

In the drawings, a modular magnetic field structure 10 is provided with two slots 12 and 14 formed in an air-gap face 16, opposite which a plate-like armature 18, guided as desired, can move longitudinally. Each slot 12, 14 receives one or more active conductors. In the embodiment illustrated in FIG. 1 these conductors are formed by portions of windings formed as coils 20, 22 respectively. The end of the coils 20, 22 are connected to two of the phases (for example I and III) of a three-phase current source and to a neutral point, to which phase II may be connected by way of an impedance or resistor 24 if internal balancing of the phases is to be maintained. Alternatively, of course, balancing may be provided by the supply system.

The air-gap face 16 is divided into three pole faces A, B, C by the slots 12, 14. These faces are of equal dimensions, and, to preserve the magnetic flux, the lines of force 21 due, for example, to the conductor 20 and leaving the face A are distributed substantially equally between the faces B and C through which they return. The value for the flux resulting from the current flowing in the conductor 20 and linking with the face A is therefore $2F_1$, and the value for each of the faces B and C is $-F_1$. The distribution of the flux due to the conductor 22 is similar, and the combination of these fluxes gives for each of the pole faces the following values:

Pole face A : $2F_1 + F_2$
Pole face B : $F_2 - F_1$
Pole face C : $-2F_2 - F_1$.

The alternating currents supplied to the conductors 20, 22 are out of phase with one another by an angle of $2\pi/3$, and their instantaneous values may be represented by the equations $$i_1 = I_m \cos\left(wt + \frac{\pi}{6}\right) \text{ and } i_2 = I_m \cos\left(wt + \frac{\pi}{6} - \frac{2\pi}{3}\right),$$

in which the indices 1 and 2 are assigned to the conductors 20 and 22 respectively, $I_m$ and $w$ being constants and $t$ representing time. From the equations given above the fluxes, or more precisely the magnetic fields, for the different pole faces can be written in the form:

Pole face A : K cos wt
Pole face B : K cos (wt $-2\pi/3$)
Pole face C : K cos (wt $+2\pi/3$).

Persons skilled in the art will recognize the expressions of the magnetic fields produced by three identical coils arranged at 120 electrical degrees to one another and supplied by a three-phase system, so as to produce a magnetic field travelling along the pole faces. This travelling wave is produced from two conductors suitably arranged and supplied, and it applies a thrust to an armature 18 subject to its effect, tending to move this armature along with it.

The $2\pi/3$ phase shift corresponds to the difference between phases in a three-phase current. Obviously, however, this phase shift may be produced in any manner, for example, using a single-phase source and an appropriate phase shift device.

The slots 20, 22 may be larger than those in an inductor of the same size with a conventional coil, and the conductor cross-section per slot can therefore be increased. It is not necessary to describe the operation of the motor, which is clear from the preceding description, the armature 18 being displaced under the influence of the travelling magnetic field.

A plurality of modular elements may be combined in a well-known manner to increase the available thrust.

Although this kind of coil is particularly advantageous in the case of a two-slot magnetic field structure with three pole faces, it may, of course, be used for longer structures, for example with a plurality of pole pitches, in which case the associated conductors may be connected in series in conventional fashion by connecting coil ends together.

What is claimed is:

1. A two-phase linear induction motor arrangement comprising a magnetic field structure and an elongated armature adapted for relative movement one with respect to the other in the longitudinal direction of said armature, said magnetic field structure being adapted and positioned relative to said armature to define three adjacent coplanar pole faces spaced apart in said longitudinal direction and separated from said armature by a small gap, and a pair of coils including active conductor means extending on said magnetic field structure transversally of said longitudinal direction along the transition zones between said pole faces, said coils carrying respectively alternating currents substantially 120 electrical degrees out of phase so as to produce in said gap a magnetic field moving in said longitudinal direction to cause said relative movement.

2. A linear induction motor arrangement according to claim 1, wherein said pair of coils is supplied by two phase currents of a three-phase system.

3. A linear induction motor arrangement according to claim 1, wherein said three pole faces have substantially equal dimensions.

4. A linear induction motor arrangement according to claim 1, wherein said magnetic field structure comprises a pair of slots extending perpendicularly to said longitudinal direction along said transition zones to accommodate said active conductor means, respectively.

* * * * *